US012758011B2

(12) United States Patent
Law et al.

(10) Patent No.: US 12,758,011 B2
(45) Date of Patent: Oct. 13, 2026

(54) SECURED STORAGE UNIT

(71) Applicant: EXTRO CODE SDN BHD, Petaling Jaya (MY)

(72) Inventors: Chee Kwa Law, Shah Alam (MY); Chor Ping Law, Shah Alam (MY); Chor Teng Law, Shah Alam (MY); Yuan Huai Lew, Puchong (MY); Kee Cheong Lim, Kuala Lumpur (MY)

(73) Assignee: EXTRO CODE SDN BHD, Petaling Jaya (MY)

( * ) Notice: Subject to any disclaimer, the term of this patent is extended or adjusted under 35 U.S.C. 154(b) by 23 days.

(21) Appl. No.: 18/841,072

(22) PCT Filed: Feb. 24, 2023

(86) PCT No.: PCT/MY2023/050014
§ 371 (c)(1),
(2) Date: Aug. 23, 2024

(87) PCT Pub. No.: WO2023/163583
PCT Pub. Date: Aug. 31, 2023

(65) Prior Publication Data

US 2025/0179859 A1 Jun. 5, 2025

(30) Foreign Application Priority Data

Feb. 25, 2022 (SG) .......................... 10202201926Y
Feb. 22, 2023 (SG) .......................... 10202300462W

(51) Int. Cl.
*E05B 65/00* (2006.01)
*A47B 81/00* (2006.01)
(Continued)

(52) U.S. Cl.
CPC ............ *A47B 81/005* (2013.01); *A47B 81/00* (2013.01); *E05B 65/0075* (2013.01); *A47B 47/03* (2013.01);
(Continued)

(58) Field of Classification Search
CPC .................................. A47B 47/03; E05G 1/08
See application file for complete search history.

(56) References Cited

U.S. PATENT DOCUMENTS 4,246,769 A * 1/1981 Mclaughlin ........... E05B 65/462 312/219
6,666,056 B1 12/2003 Horton
(Continued)

FOREIGN PATENT DOCUMENTS

CN 110259279 A 9/2019
CN 113384093 A 9/2021

OTHER PUBLICATIONS

International Search Report and Written Opinion for PCT International Application PCT/MY2023/050014, mailed Apr. 18, 2023.

*Primary Examiner* — Kimberley S Wright
(74) *Attorney, Agent, or Firm* — Patentbest; Andrew McAleavey

(57) ABSTRACT

The present invention provides a storage unit (10) compressing: a cabinet body (200) comprises: at least one storage compartment (210); a horizontal beam member (230) arranged on one side of the cabinet body (200), a shutter door system (220) having at least one shutter door for each compartment (210) coupled with a mechanism controlled by a controller unit to open or close the shutter door, where the shutter door system (220) is connected to the horizontal beam member (230); a cam mechanism (250), connected to the horizontal beam member (230); and, an emergency lever (260), linked with the cam mechanism (250), wherein in use when the emergency lever (260) is rotated to an open (Continued)

configuration, the cam mechanism (250) rotates in similar direction to the emergency lever (260) causing the horizontal beam member (230) to be lifted up and subsequently pull or push to open all the shutter doors simultaneously so that all the compartments can be accessed.

12 Claims, 18 Drawing Sheets

(51) Int. Cl.

| | |
|---|---|
| *A47B 47/03* | (2006.01) |
| *E05B 65/462* | (2017.01) |
| *E05G 1/08* | (2006.01) |
| *G07C 9/00* | (2020.01) |

(52) U.S. Cl.

CPC .............. *E05B 65/462* (2013.01); *E05G 1/08* (2013.01); *E05Y 2900/20* (2013.01); *E05Y 2900/21* (2013.01); *G07C 9/00912* (2013.01)

(56) References Cited

U.S. PATENT DOCUMENTS

| | | | | |
|---|---|---|---|---|
| 2005/0251687 | A1* | 11/2005 | Bachinski .......... | G07C 9/00563 713/186 |
| 2013/0113344 | A1* | 5/2013 | Elwell .................... | A47B 81/00 312/304 |
| 2018/0110331 | A1* | 4/2018 | Mack ................... | A47B 47/025 |
| 2020/0349796 | A1* | 11/2020 | Gokcebay .......... | G07C 9/00896 |
| 2021/0262276 | A1 | 8/2021 | Hayman | |
| 2023/0034694 | A1* | 2/2023 | Kelly .................... | E05B 65/462 |

* cited by examiner

SECURED STORAGE UNIT

FIELD OF THE INVENTION

This invention relates to a storage unit and more particularly to a weapon storage device with a secured locking mechanism.

BACKGROUND OF THE INVENTION

Many organizations such as the military, police or other paramilitary organizations must store a quantity of weapons and firearms on premises. In order to maintain a safe environment and to comply with various gun control laws, it is usually required that the firearms be stored in a secure gun locker.

The different types of firearms are securely kept within the lockers or cabinet to inhibit unlawful or unauthorised access to the firearms. Various weapon lockers are available in the market. They generally include a cabinet with a locking door and one or more supports for holding the firearms. While these gun cabinets are useful in storing and safeguarding dangerous weapons, the cabinet doors are provided locking means devised to restrict access to firearms lockers.

One such example can found in U.S. Pat. No. 6,666,056B1 titled "Internal Locking Device for use on Magazine Door" discloses an internal locking device adapted for use with the magazine doors of a weapons storage facility to lock the magazine doors and secure the facility. The internal locking device use a single key and key guide for key insertion and for reduction of key breakage. The internal locking device includes a locking bolt which when disengaged from the output shaft by an operator rotating the key allows the operator turn handle which turns the output shaft for the device unlocking the magazine doors.

However, such type of locking means was observed to be easily tampered with in order to get access to the firearms held therein. This is because most of the locking means are actuated by an actuator means, such as the key to lock and unlock the lockers.

Further, the weapons can be easily viewed through the doors of the cabinets without opening the cabinets due to this there is a possibility in leakage of information of the weapons contained in the cabinets.

Therefore, there is a need for a weapon storage unit with a secured locking mechanism and can restrict to view the weapons in it.

SUMMARY OF THE INVENTION

The present invention provides a storage unit comprising: a cabinet comprises: at least one storage compartment; a horizontal beam member arranged on one side of the cabinet; a shutter door system having at least one shutter door for each compartment coupled with a mechanism controlled by a controller unit to open or close the shutter door, where the shutter door system is connected to the horizontal beam member; a cam mechanism, connected to the horizontal beam member; and, an emergency lever, linked with the cam mechanism, wherein when the emergency lever is rotated to an open configuration, the cam mechanism rotates in similar direction to the emergency lever causing the horizontal beam member to be lifted up and subsequently pull or push to open all the shutter doors simultaneously so that all the compartments can be accessed.

Preferably, the storage unit further comprises a cover having a space formed by a top panel, a rear panel, and two opposing side panels to receive the cabinet in the space.

Preferably, bottom inner side portion of the side panels are provided with a locking hole.

Preferably, the shutter door system coupled with a mechanism comprises of a plurality of shutter door rods arranged horizontally and vertically to hold the shutter door for the each compartment.

Preferably, the cabinet further comprises of a vertical guide rod, arranged on at least one side of the cabinet is connected on at least one end of the horizontal beam member.

Preferably, the cabinet is locked to the cover when the emergency lever is rotated toward engage position causes the vertical guide rod to be inserted into the locking hole of the cover.

Preferably, the cabinet is unlocked from the cover when the emergency lever is rotated toward disengage position causes the vertical guide rod to be pulled out from the locking hole of the cover.

Preferably, the cam mechanism further comprises of a cam and a cam follower, where the cam follower is arranged in the cam.

Preferably, the cam is provide with a curved slot for the cam follower to move in freely within it.

Preferably, the cabinet further comprises of a security door for the emergency lever to be accessed.

Preferably, the security door is operated between unlock and lock position using a key or any other suitable means.

Preferably, the security door comprises of an upper latch plate, a central latch plate, a lower latch plate and a key latch plate arranged together to move relatively between lock and unlock positions of the security door using the key.

Preferably, the storage unit is to store weapons, firearms or any other suitable items in the cabinet.

BRIEF DESCRIPTION OF DRAWINGS

These and other features, aspects, and advantages of the present invention will become better understood, when the following detailed description is read with reference to the accompanying drawings in which like characters represent like parts throughout the drawings, wherein.

DETAILED DESCRIPTION OF THE INVENTION

Figure 1A:
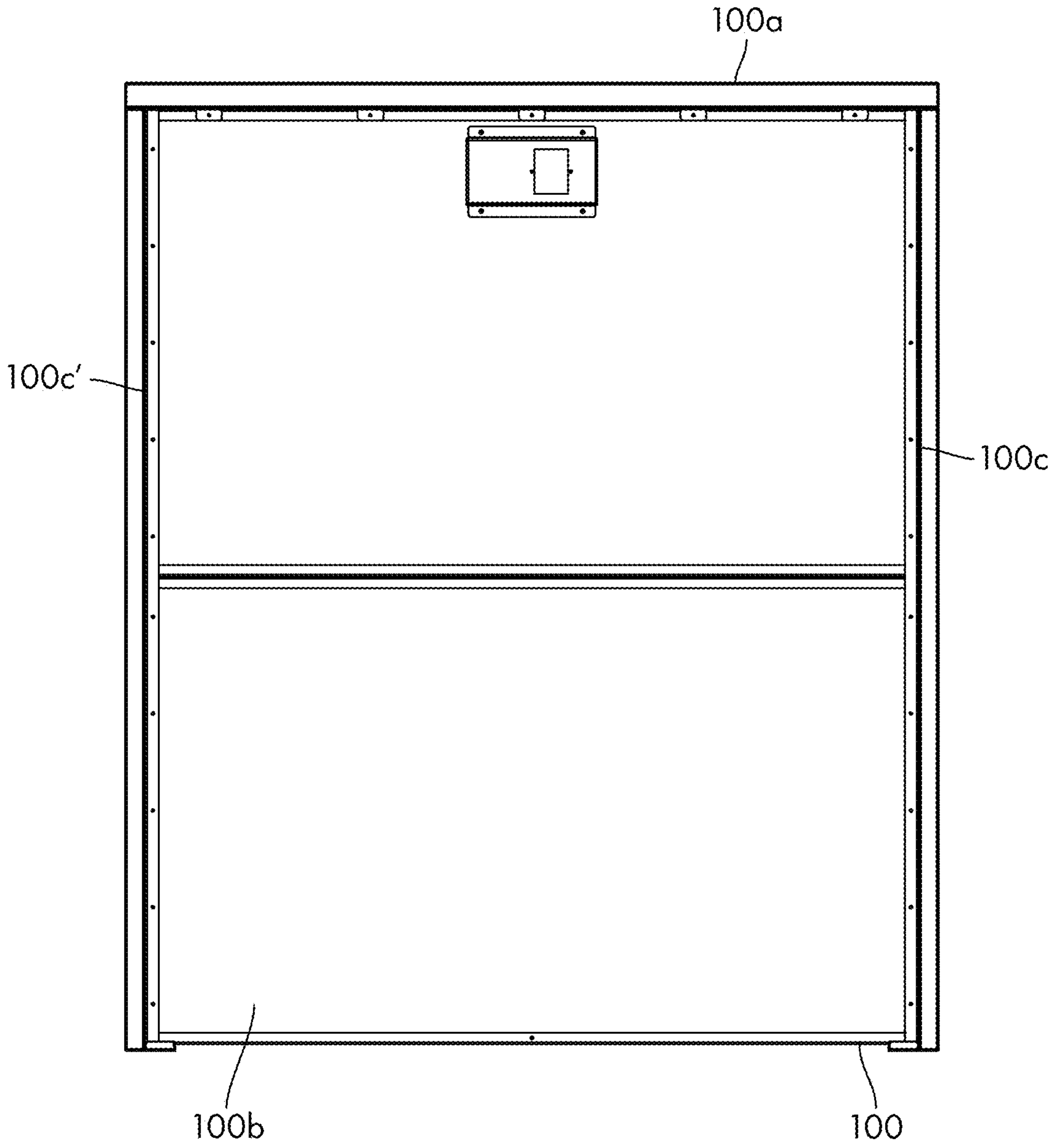
FIG. 1*a* is a front view of a cabinet cover.
Figure 1B:
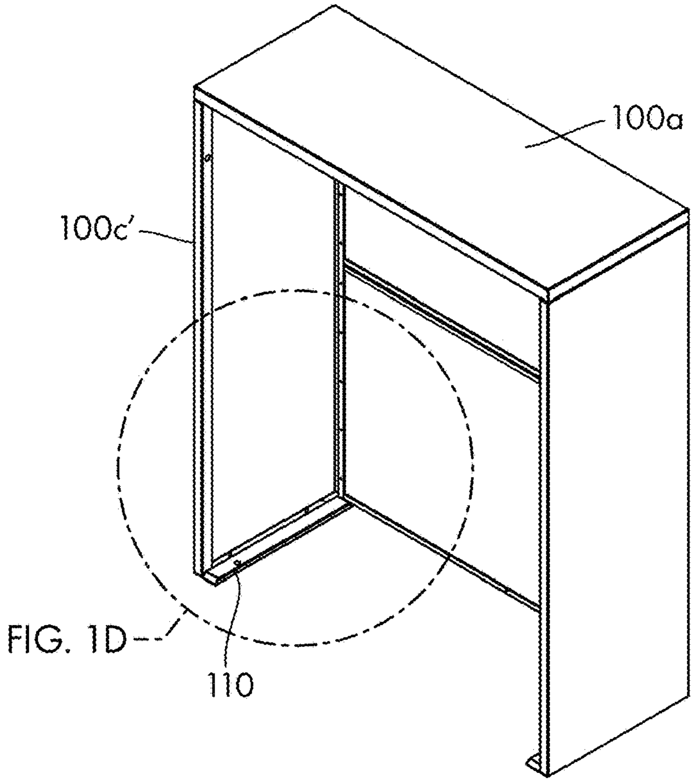
FIG. 1*b*, 1*c*, 1*d* & 1*e* are perspective views of a locking hole arranged at bottom inner side of the both side panels of the cabinet cover.
Figure 1C:
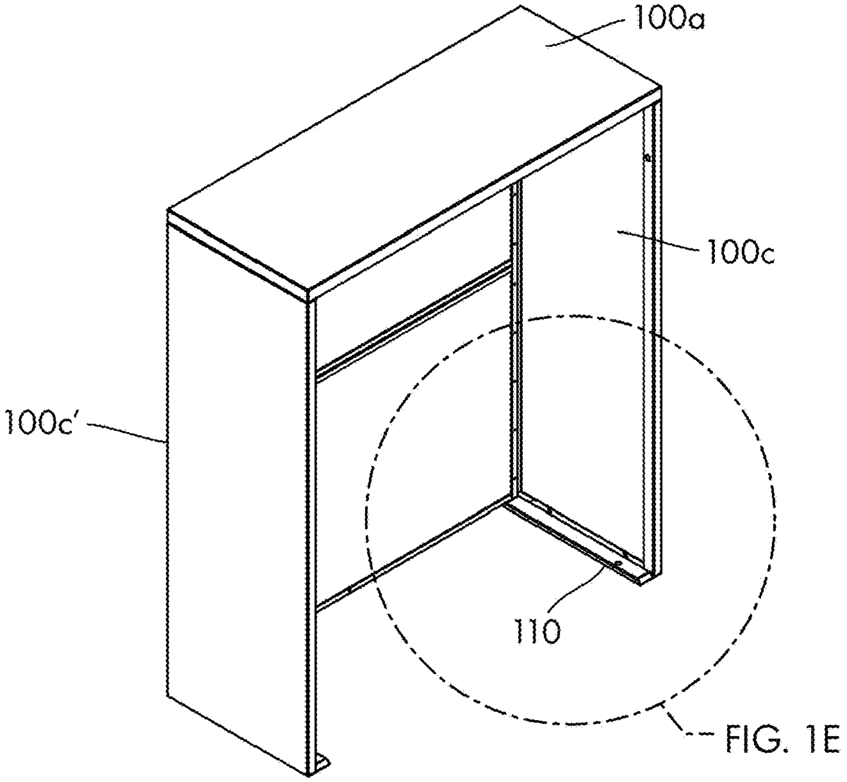
Figure 1D:
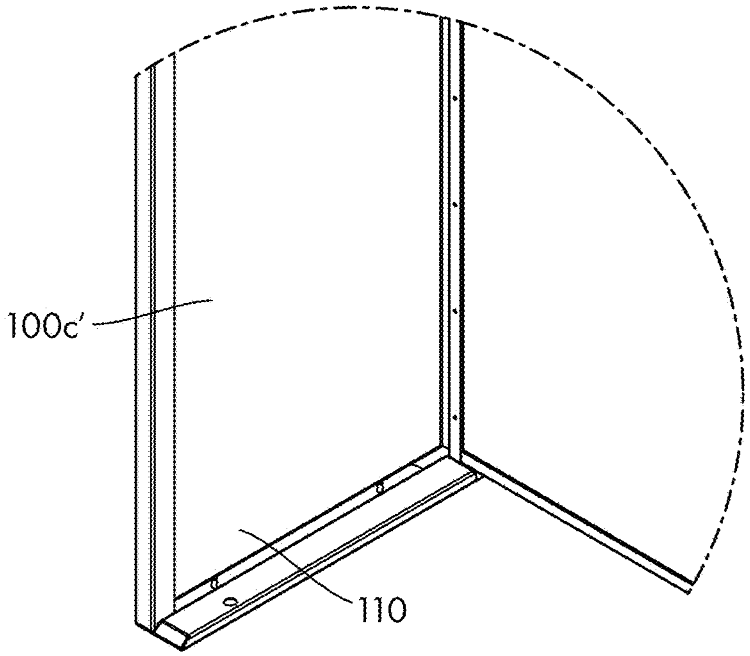
Figure 1E:
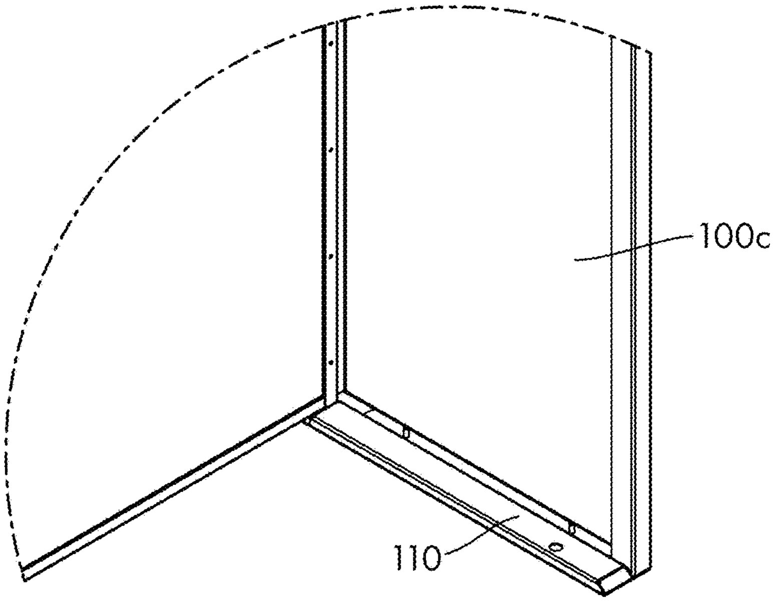
Figure 2A:
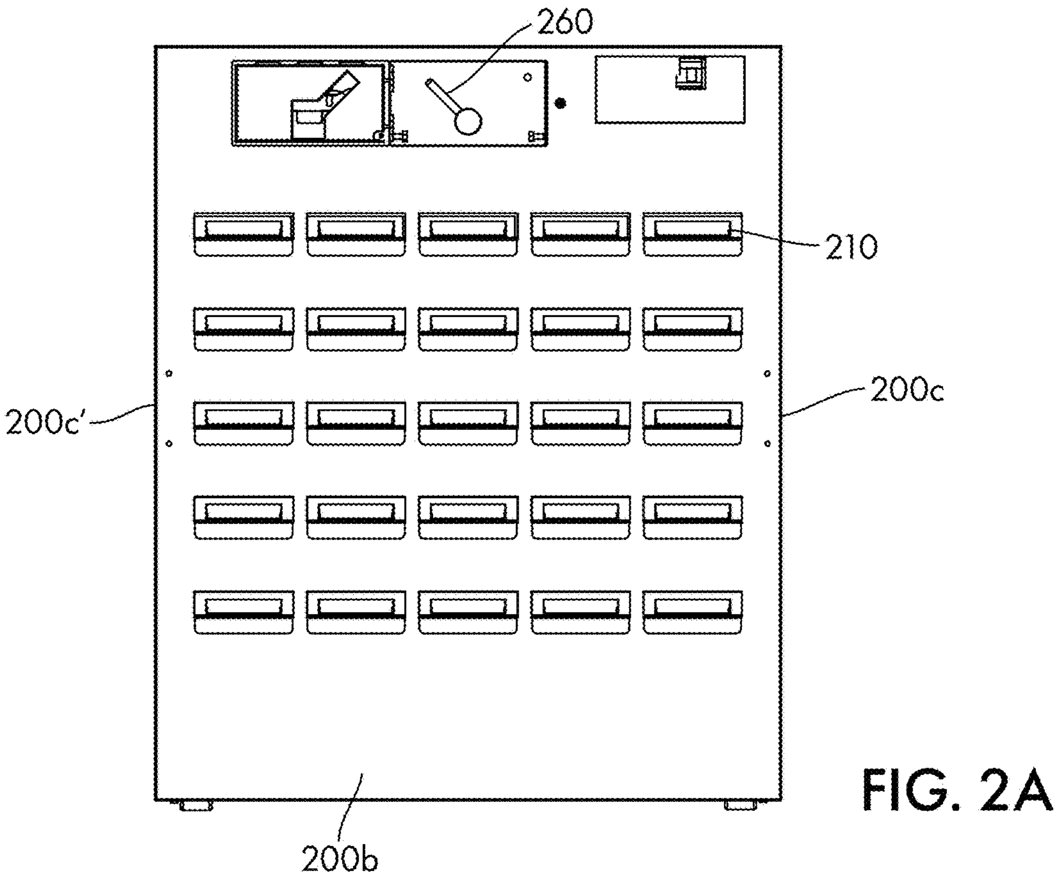
FIG. 2*a* is a front view of a cabinet.
Figure 2B:
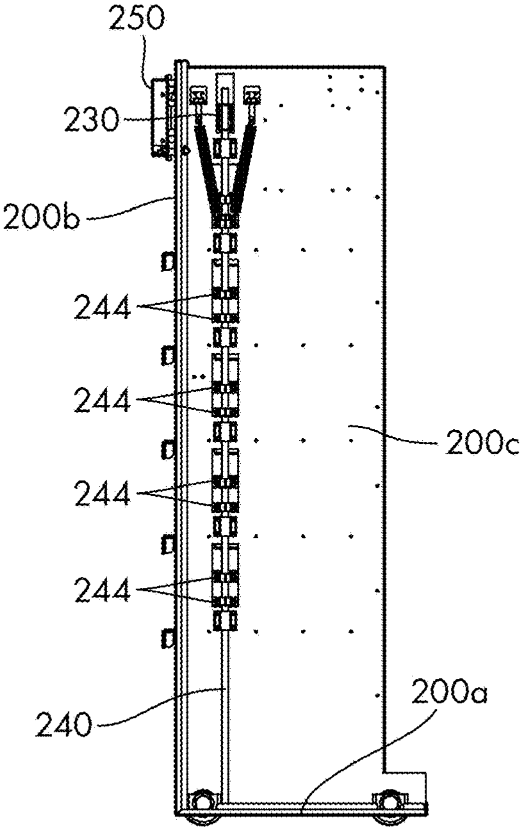
FIG. 2*b* is a side view of the cabinet.
Figure 2C:
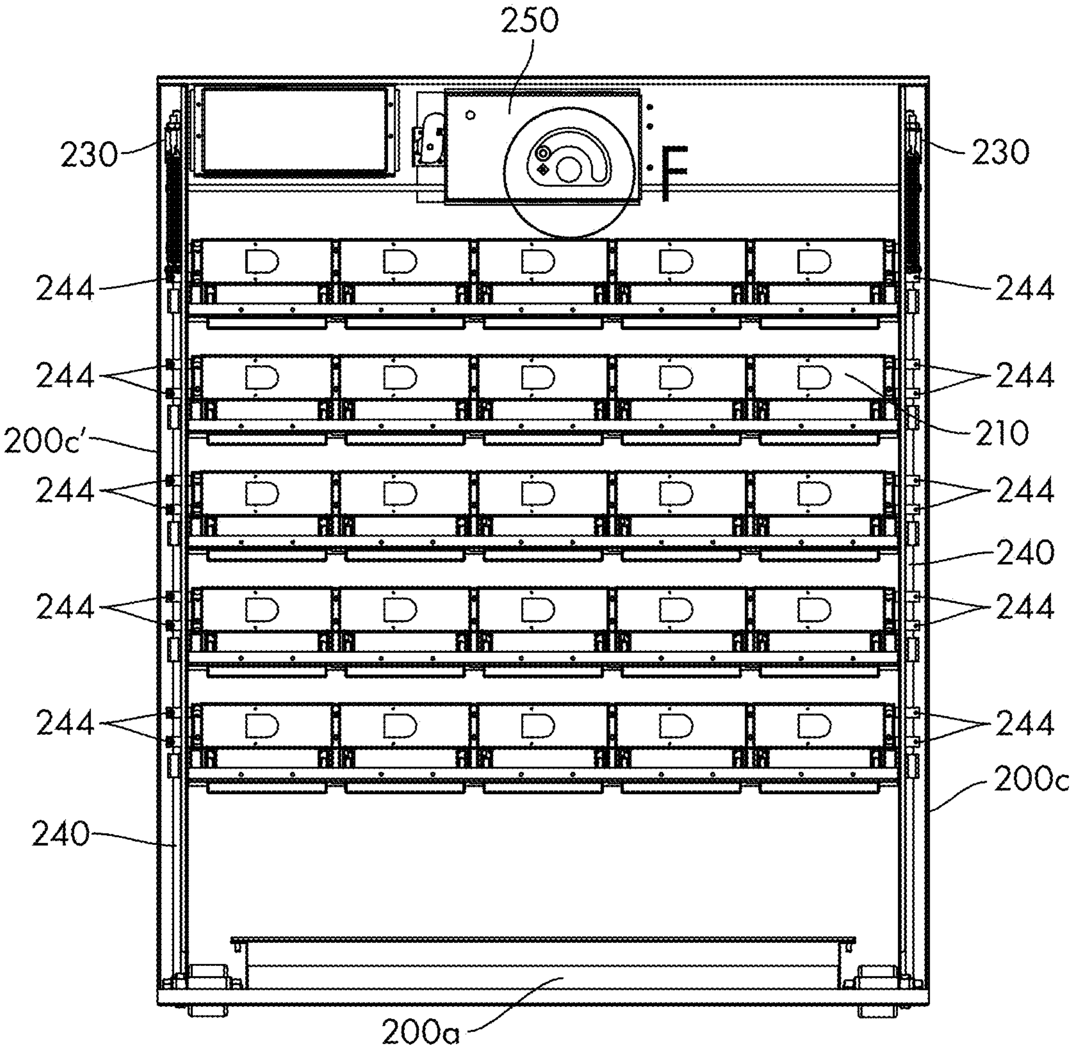
FIG. 2*c* is a back view of the cabinet with horizontal beam member hidden.
Figure 2D:
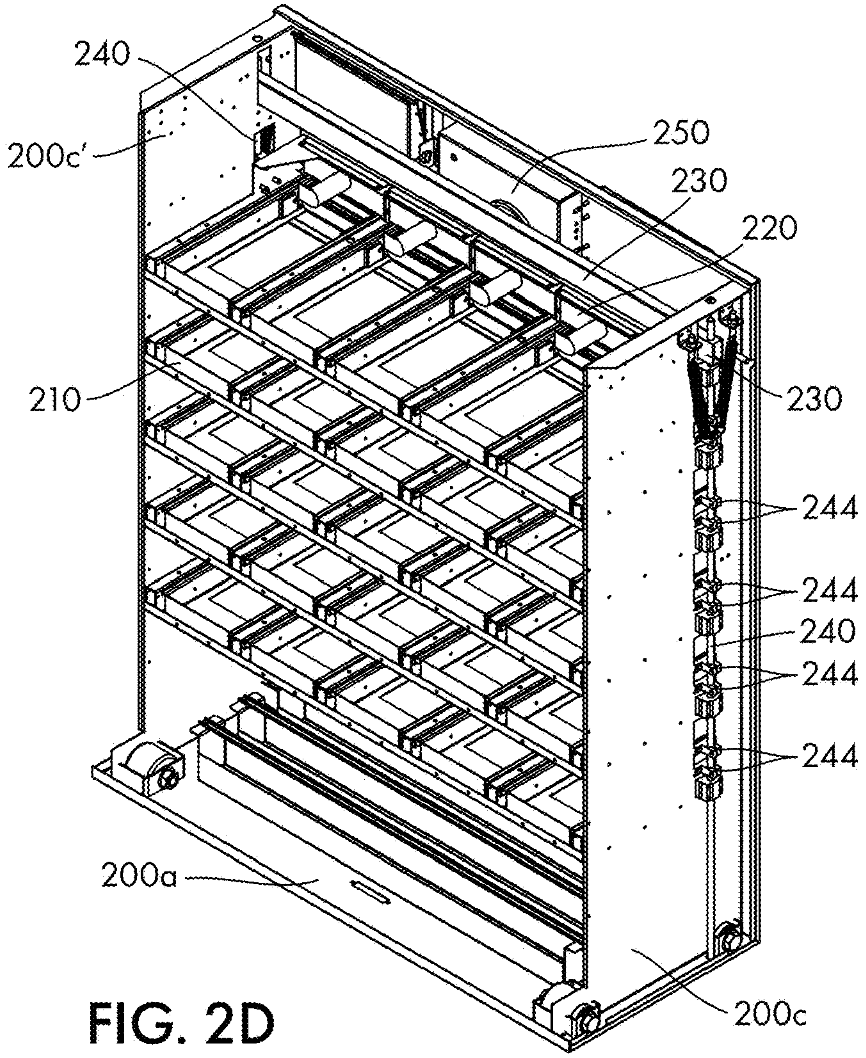
FIG. 2*d* is a perspective view of the cabinet with cam mechanism partially hidden in a disengaged position.
Figure 2E:
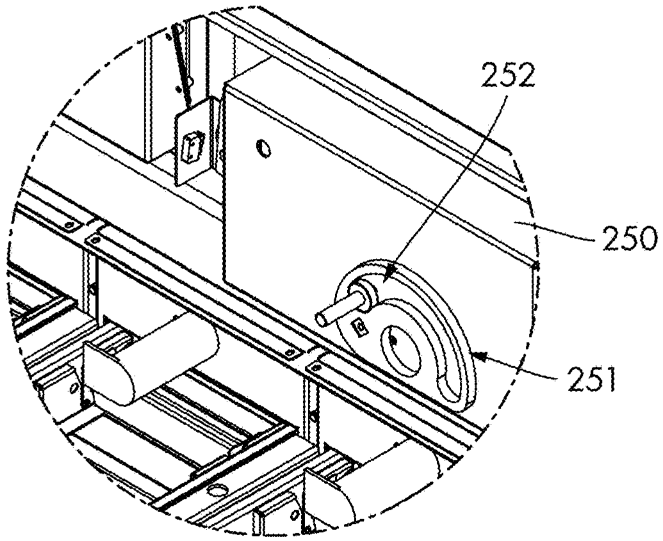
FIG. 2*e* is a close view of the cam mechanism in the disengaged position with the horizontal beam member hidden.
Figure 3A:
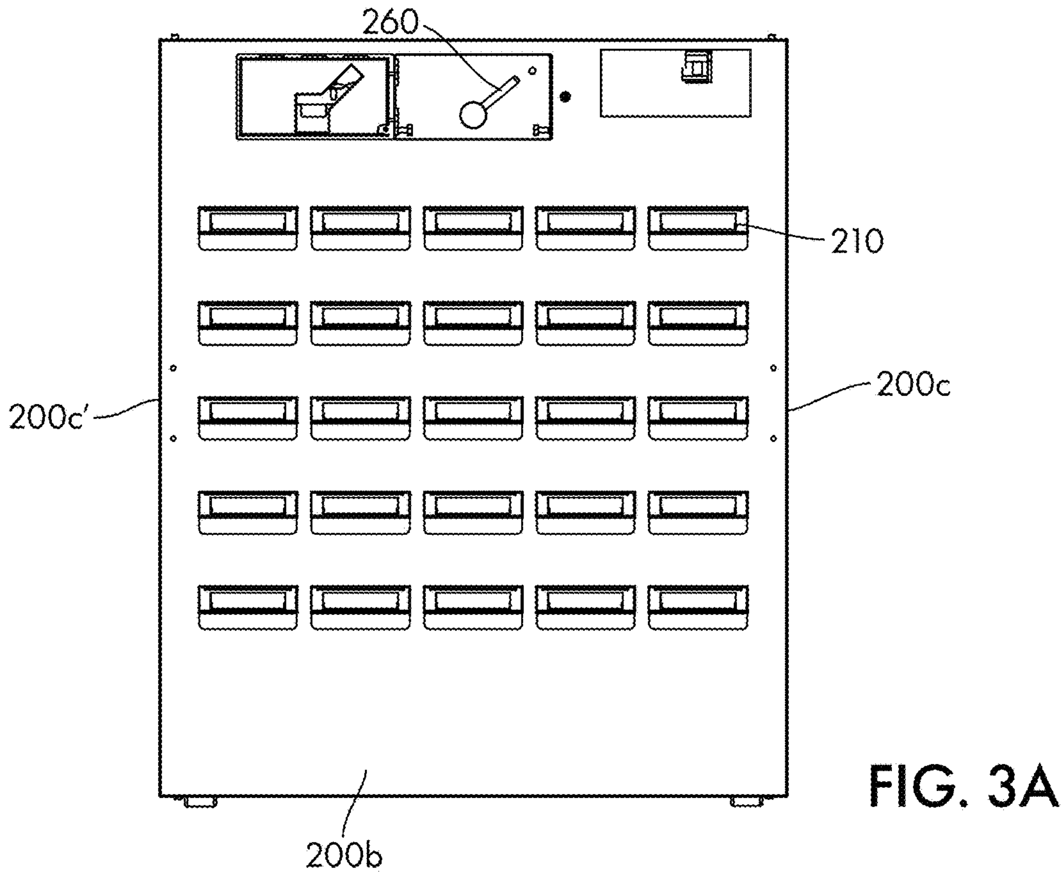
FIG. 3*a* is a front view of the cabinet showing the position of the emergency lever in engaged position.
Figure 3B:
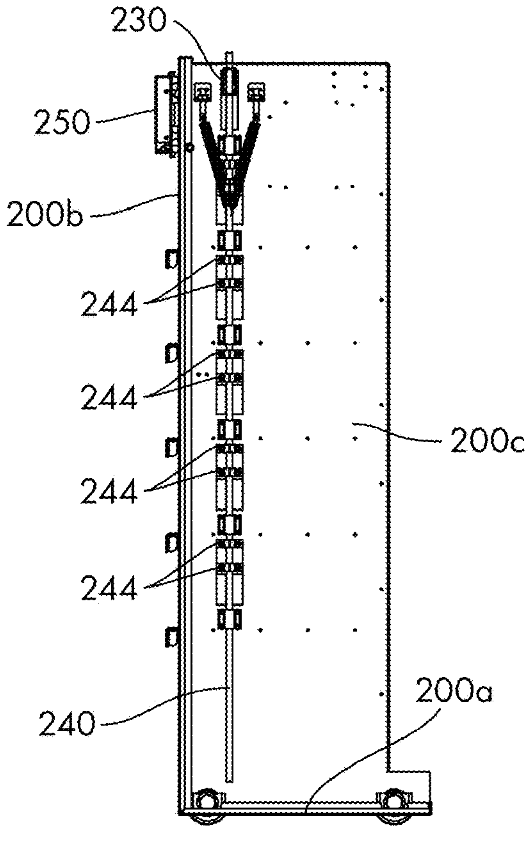
FIG. 3*b* is a side view of the cabinet in the engaged position.
Figure 3C:
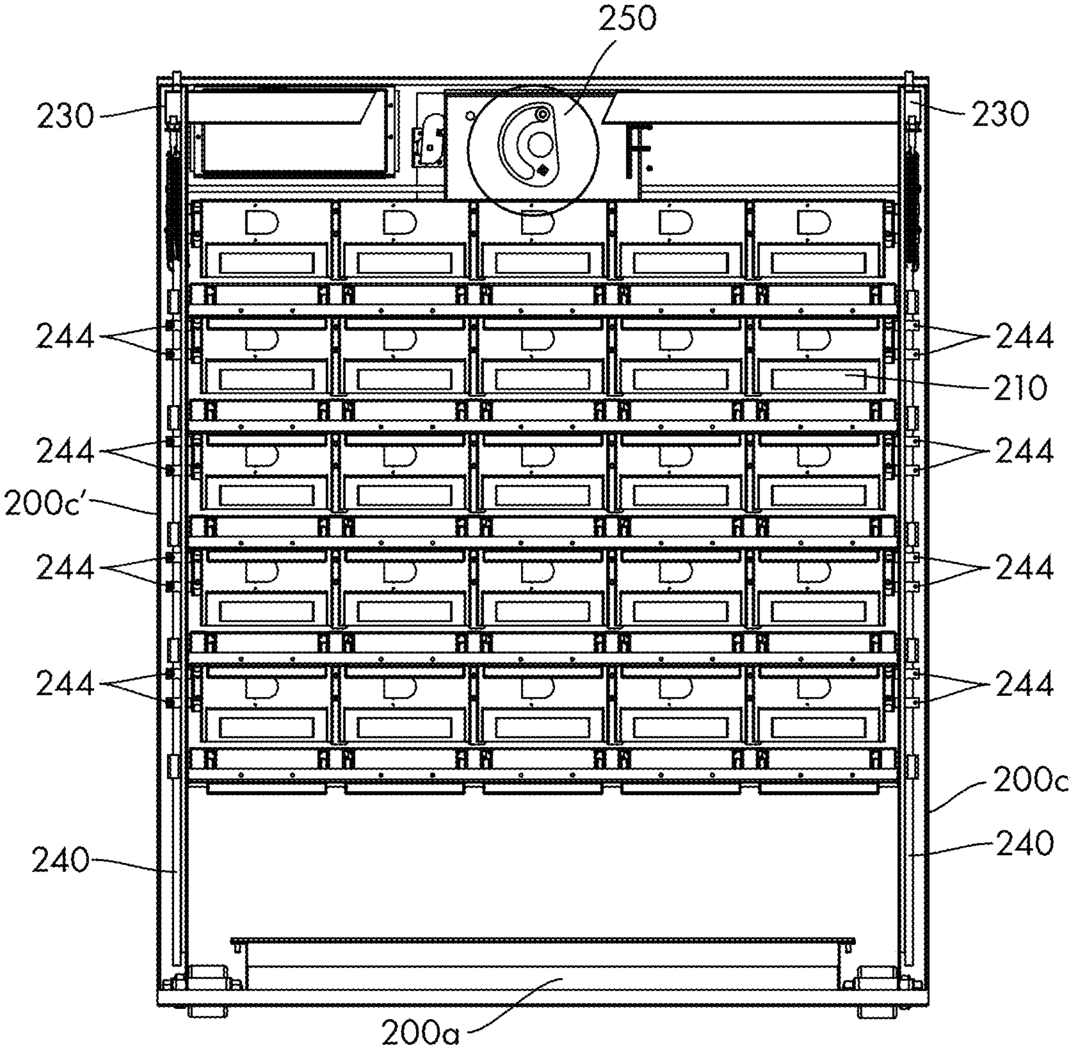
FIG. 3*c* is a back view of the cabinet in engaged position.
Figure 3D:
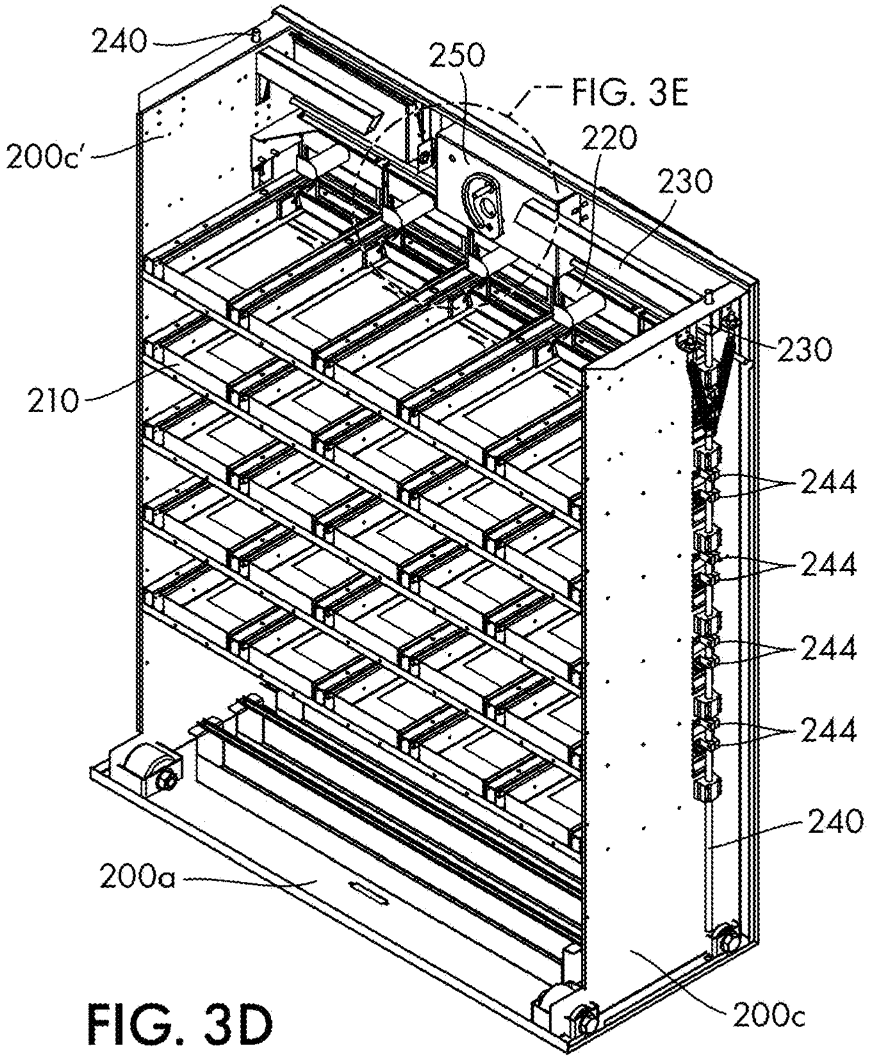
FIG. 3*d* is a perspective view of the cabinet with the cam mechanism partially hidden.
Figure 3E:
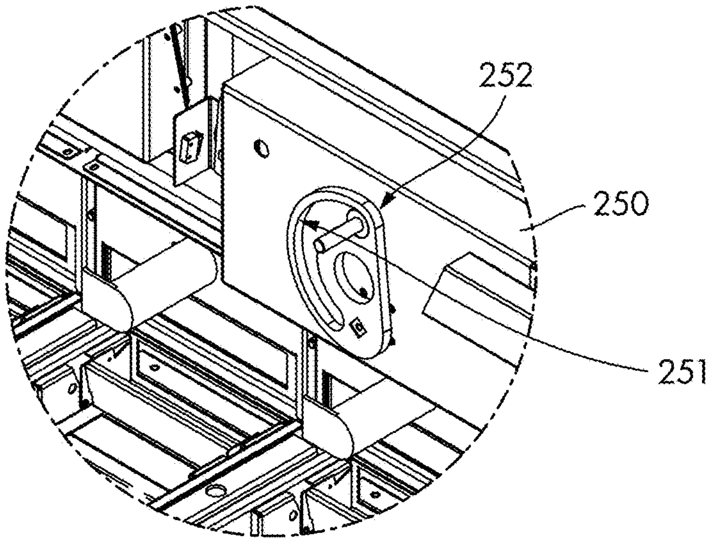
FIG. 3*e* is a close view of the cam mechanism in the engaged position with the horizontal beam member hidden.
Figure 4A:
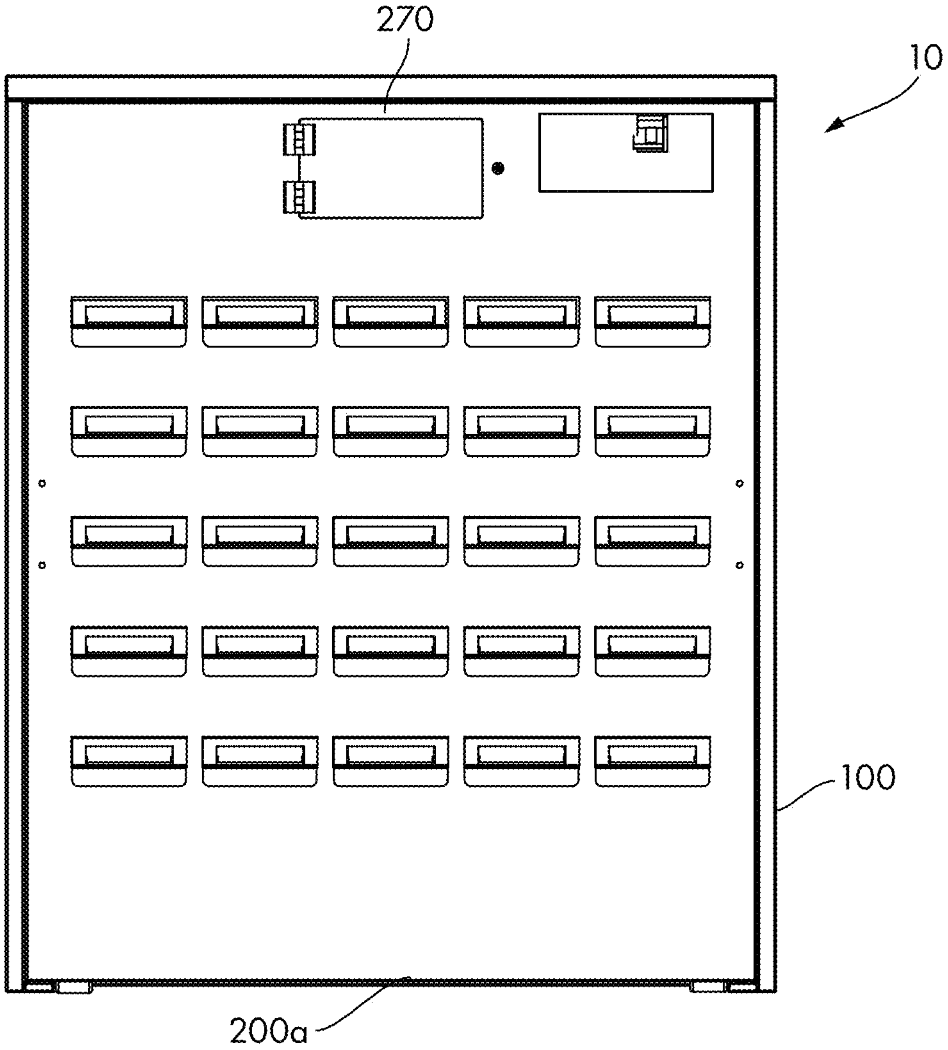
FIG. 4*a* is a front view of the storage unit showing security door for the emergency lever.
Figure 4B:
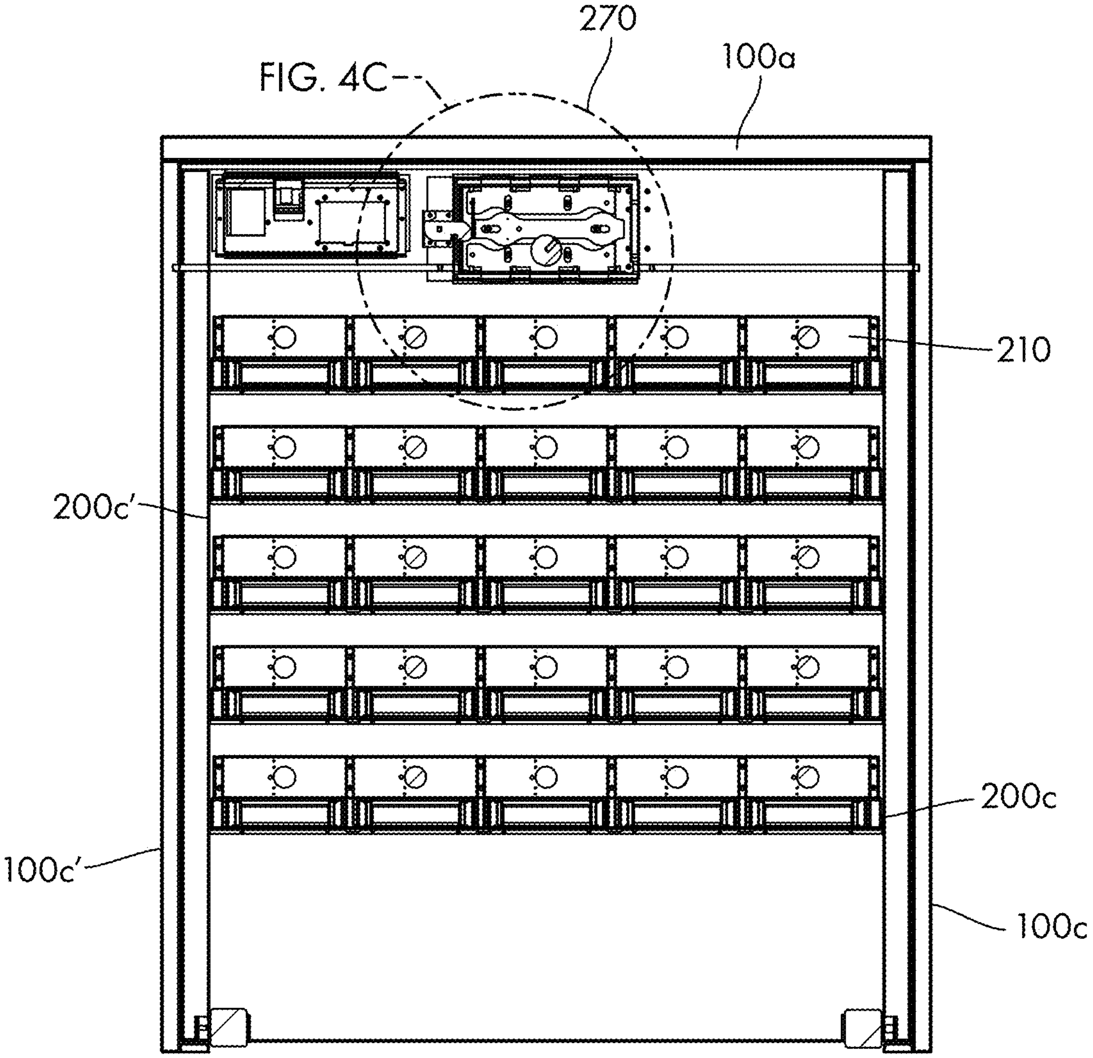
FIG. 4*b* is a back of the security door for the emergency lever.
Figure 4C:
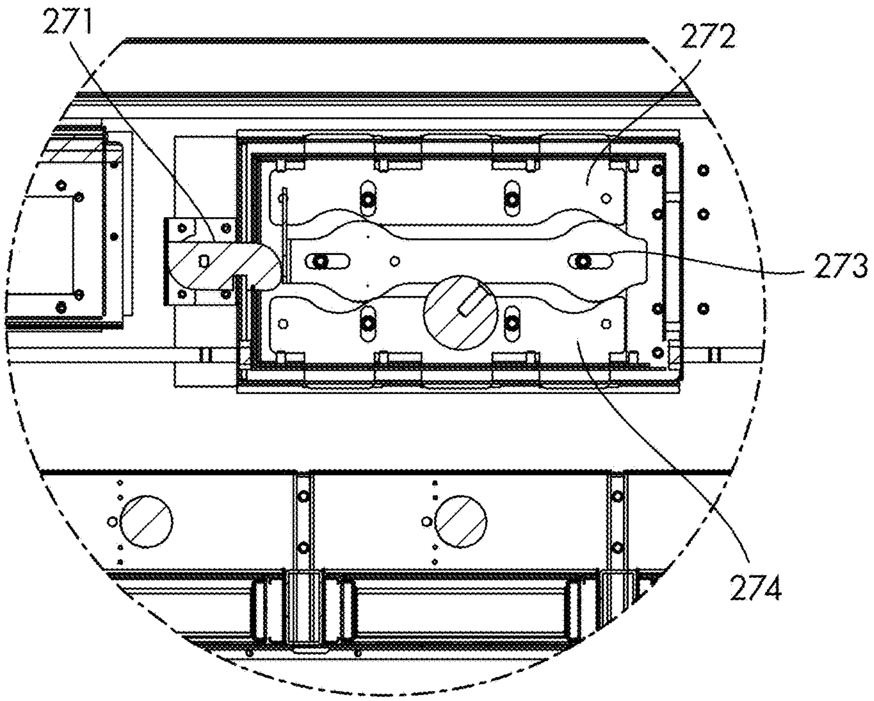
FIG. 4*c* is a close view of the security door in locked position.
Figure 4D:
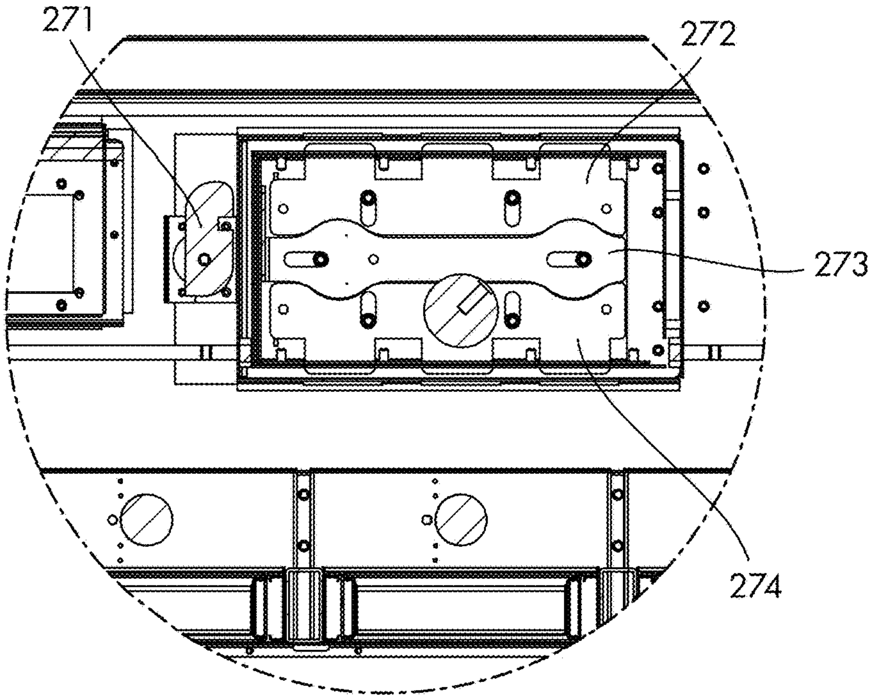
FIG. 4*d* is a close view of the security door in unlocked position.

This invention provides a storage unit (10) in which weapons may be readily stored and retrieved and wherein a maximum number of weapons may be stored in a minimum space.

The storage unit (10) comprises of a cabinet cover (100) and a cabinet body (200).

Preferably, the cabinet body (200) is inserted into the cabinet cover (100) to form a complete sealed storage unit (10). Referring to the FIGS. 1*a* to 1*e*, the cabinet cover (100) having a space formed by a top panel (100*a*), a rear panel (100*b*), two opposing side panels (100*c*, 100*c*'), a front opening forming the space, and a bottom side inner portion of each side panel (100*c*, 100*c*') is provided with a channel having at least one locking hole (100) in it. The space formed in the cabinet cover (110) is to receive the cabinet body (200) into it. The cabinet body (200) can be movable with wheels arranged beneath or stationary with legs provided.

Referring to the FIGS. 2*a* to 2*e*, the cabinet body (200) is in the form of a box like rack structure. The cabinet body (200) comprises a base (200*a*), two spaced apart sidewalls (200*c*, 200*c*'), a front portion (200*b*), a plurality of cartridge storages or compartments (210), a shutter door system (220), a horizontal beam member (230), a vertical guide rod (240), a cam mechanism (250) and an emergency lever (260). The front portion (200*b*) is provided with a plurality of openings that matches with the cartridge storage (210) such that the cartridge storage (210) can extend through the openings on the front portion (200*b*). The cartridge storages (210) are preferably in the form of a plurality of spaced apart cut-out portions, each cut-out portion is designed to receive and adopt a recess member. The recess member generally comprises a flat base and an upstanding perimeter sidewall. When the recess member is introduced into the cut-out portions, it will act as a restricting means to restrict further movements of the recess member into the cut-out portion. When the recess member is securely held within the cut-out portions, a recess portion is created therein. The horizontal beam member (230) arranged on the top portion is connected to the emergency lever (260) via the cam mechanism (250). The vertical guide rods (240) are arranged on both sidewalls (200*c*, 200*c*') connects the horizontal beam member (230) on both ends and a spring actuated mechanism arranged to hold the vertical guide rod (240) in position. Further, the spring actuated mechanism assists in retraction and traction position. The shutter door system (220) is coupled with a mechanism that comprises a plurality of shutter door holder beams arranged horizontally (244) and vertically (240) to hold a shutter door for each cartridge storage (210). One end of each vertical shutter door beam (240) is connected to the horizontal beam member (230) in a position and both ends of the horizontal shutter door beams (244) are supported by the vertical guide rod (240) on the either sides of the sidewalls (200*c*, 200*c*'). This arrangement allows the shutter doors to be held in a position for each cartridge storage (210) and assists in opening and closing of the cartridge storages (210). The cam mechanism (250) comprises of a cam (251) and a cam follower (252). The cam (251) is a shaped piece of metal or plastic. The cam follower (252) is a rod that rests on the edge of the turning cam and connected to the emergency lever (260). The cam (251) is provided with a curved slot. The cam follower (252) is arranged in the curved slot of the cam (251) and is moveable within the curved slot. The horizontal beam member (230) is linked to the cam follower (252).

Still referring to FIGS. 2*a* to 2*e*, in operation when the emergency lever (260) is rotated towards to disengage position causes the cam (251) to rotate in a similar direction. This causes the cam follower (252) to rotate in the curved slot of the cam (251) and retracts the horizontal beam member (230) from its home position to displaced position which effectively causes the shutter door system (220) to open up the cartridge storages (210). Simultaneously causes the vertical guide rods (240) to be pulled up from the locking hole (110) of the cabinet cover (100). In this position, the cabinet body (200) can be pulled out from the cabinet cover (100) to store or retrieve the weapons from the cartridge storage (210).

Referring to FIGS. 3*a* to 3*e*, when the emergency lever (260) is rotated to engage position causes the cam (251) to rotate in the similar fashion. This also causes the cam follower (252) to rotate in the curved slot of the cam (251) and pushes the horizontal beam member (230) downward which effectively causes the shutter door system (220) to close all the cartridge storages (210). Simultaneously, causes the vertical guide rods (240) to be slot into the locking hole (110) on the cabinet cover (100). This arrangement locks the cabinet body (200) in position to the cabinet cover (100).

Referring to FIGS. 4*a* to 4*d*, the emergency lever (260) is arranged within a compartment is provided with a security door (270) which can be accessed using a key. The security door (270) comprises of a key latch plate (271), upper latch plate (272), central latch plate (273) and a lower latch plate (274). The central latch plate (273) is a horizontal plate provided with at least one hump portion on its body on both sides. The upper latch plate (272) and the lower latch plate (274) are arranged on the either side on the central latch plate (273) comprises of at least one hump receiving portion arranged on the one side of both latch plates. The upper latch plate (272) and the lower latch plate (274) are also provided with at least one vertical elongated slot on it and a screw secured through the slot to hold both plates in the position in such a way that the upper latch plate (272) and lower latch plate (274) can freely move in vertical direction actuated by a spring mechanism. The central latch plate (273) is provided with at least one horizontal elongated slot on it and is secured with the screw to hold it position so that the central latch plate (273) can move freely in horizontal direction actuated by the spring mechanism. The key latch plate (271) secured on one side of the security door compartment. Using the key, the position of the key latch plate (271) is rotated between the open position and closed position to lock and unlock the security door (270).

In the locked position, the key latch plate (271) is in horizontal position causes the central latch plate (273) to move towards left position from its home position, pushing tip of the central latch plate (273) into a slot arranged in the compartment, which also causes the upper latch plate (272) to move upwards from its respective position and the lower latch plate (274) to move downwards. This cause the security door (270) to be locked.

In the unlocked position, the key latch plate (271) is in vertical position causes the central latch plate (273) to move towards right position by the tension of the spring. Due to this, the upper latch plate (272) and the lower latch plate (274) are moved back to their respective positions so as to able to swing the security door open.

Figure 5:
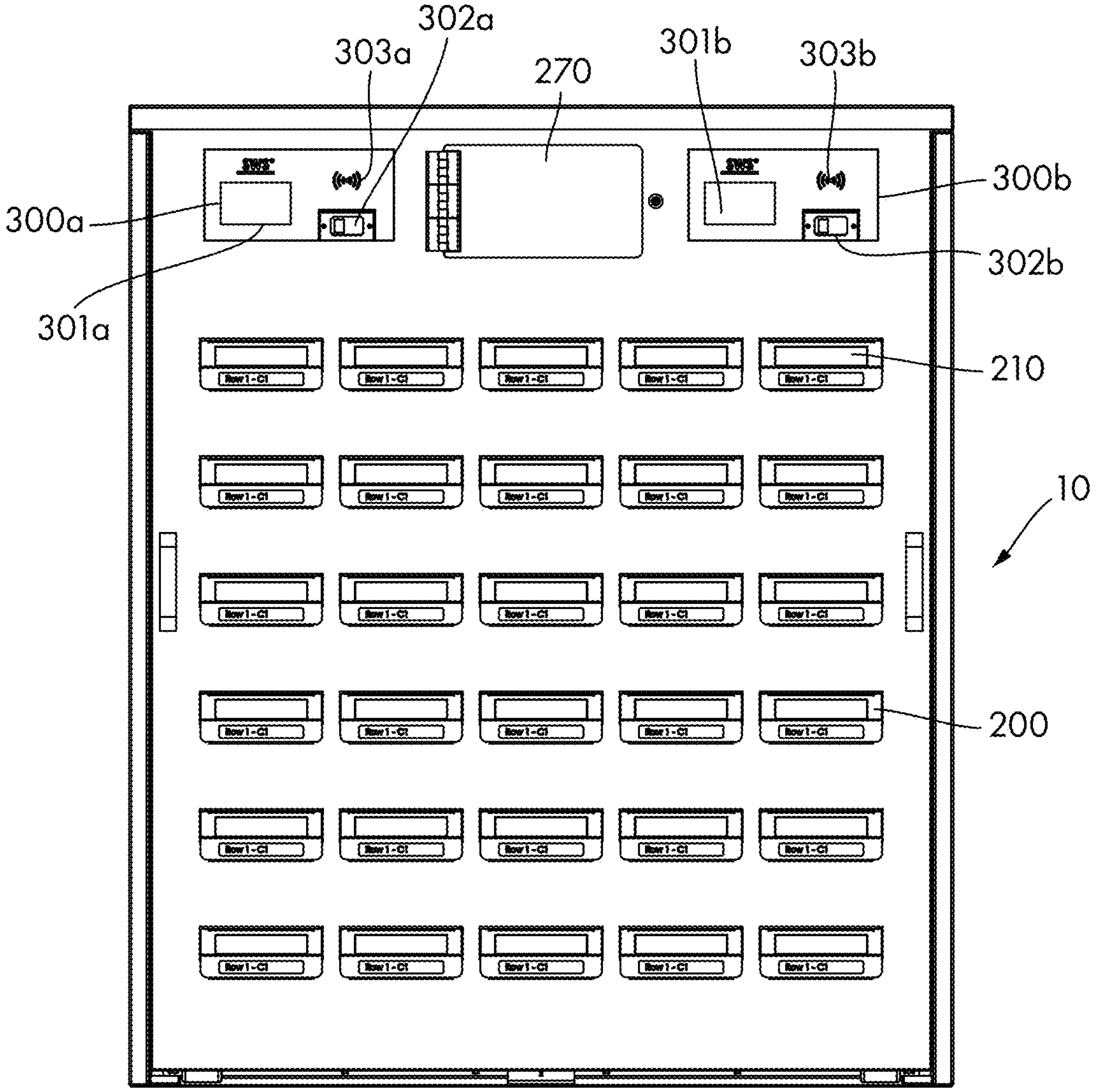
FIG. 5 is a detailed front view of the storage unit illustrating one or more user access panels.

Referring to FIG. 5, a detailed front view of the storage unit (10) is illustrated. The front end of the cabinet body (200) further includes one or more user access panels (300*a*, 300*b*) that are configured to verify users and to provide access to the plurality of cartridge storages or compartments (210). By way of example, the cabinet body includes two user access panels (300*a*, 300*b*) one on each side of the security door (270) and each user access panels (300*a*, 300*b*) comprises a touch screen display unit (301*a*, 301*b*) to provide an interactive user interface for receiving inputs from users and/or displaying outcomes or instructions, a fingerprint module (302*a*, 302*b*) for receiving fingerprints or thumbprints of the users, and a contactless card reader (303*a*, 303*b*) for obtaining information from a card of the users. It should be noted that the touch screen display unit (301*a*, 301*b*) can be easily replaced by a pure display unit coupled with physical keypads. The fingerprint module (302*a*, 302*b*) can also be replaced by any other type of biometric authentication means for detecting metrics related to the user human characteristics. Such biometric authentication means may include but is not limited to face recognition module, iris recognition module, palm recognition module, voice recognition module or any combination thereof. The user access panels (300*a*, 300*b*) can incorporate with camera modules (not shown in figure) for the facial or iris recognition. In the operation of retrieving items stored within the cartridge storages (210), the users will firstly need to scan their cards that contains their respective Service Set Identifiers via the card reader (303*a*, 303*b*). Once the service set identifier is verified, then the touch screen display unit (301*a*, 301*b*) will then prompt the users to scan their fingerprint through the fingerprint module (302*a*, 302*b*). If the obtained fingerprint information is authenticated and verified, then the storage unit (10) will be instructed to unlock the cartridge storages (210). Alternatively, after the authentication of fingerprint, the users may be further requested to key in their associated security pin codes via the touch screen display unit (301*a*, 301*b*).

Figure 6:
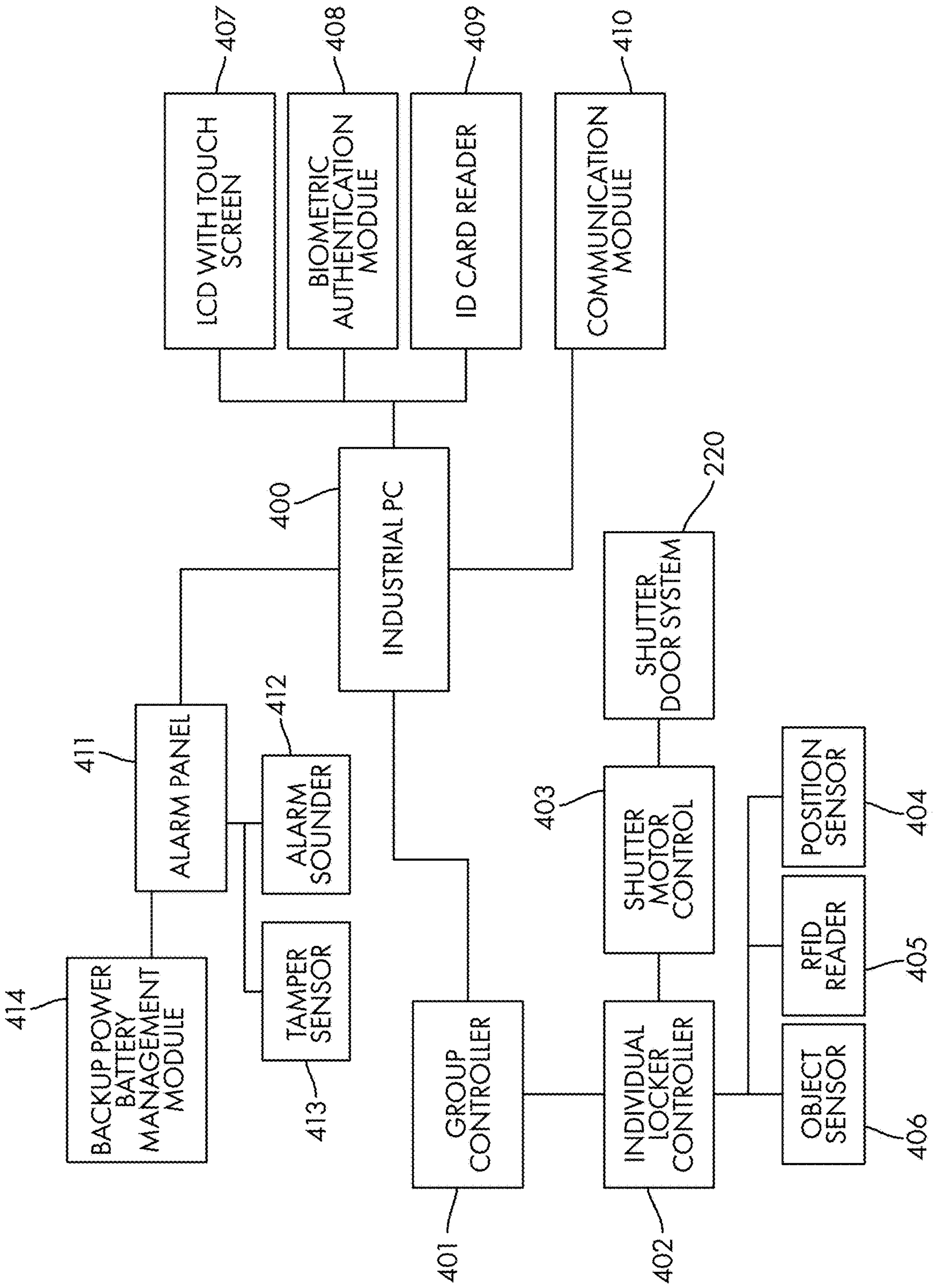
FIG. 6 is a circuit diagram illustrating a backend architecture of the storage unit.

Referring to FIG. 6, a backend circuit architecture of the storage unit (10) is illustrated. By way of example, the circuit architecture comprises one or more industrial grade printed circuit boards (400), various electrical components (401 to 414) of the storage unit (10) are connected to the printed circuit boards (400) so that their respective functionalities can be carried out. The various electrical components (401 to 414) may include components (411 to 414) from an alarm system, components (407 to 410) from the user access panels as described earlier, and components (401 to 406) from the shutter door system (220). Preferably, the printed circuit boards (400) are embedded with a processor, a local data storage and multiple different connection ports for the connections of the various electrical components (401 to 414). The different connection ports include but are not limited to RS232 ports, USB ports, RJ45 Lan ports, and HDMI ports. By way of example, the components (407 to 410) from the user access panels include a LCD with touch screen to provide an interactive user interface, a biometric authentication module (408) for processing biometric information, and an identity card reader for processing information that stored within an access card. The printed circuit boards (400) may also be connected to a centralised server via a communication module (410).

Preferably, the alarm system includes an alarm panel (411) that are connected one or more tamper sensors (413). The main function of the tamper sensors (413) are to detect the present of tampering with the storage unit (10). The tamper sensors (413) may include but is not limited to vibration sensors that are installed at strategical locations within the storage unit (10) to allow detection of brute force entry, magnet sensors for the detection of lifting, key switch sensor for the detection of entry to the security door (270), security pin sensor for the detection of force entry through the user access panels (300*a*, 300*b*). Alternatively, the alarm system may further includes a rechargeable battery pack (414) operated by a power management module to act as a back up to a main power source for operation of the alarm system or the even for the printed circuit boards (400) to operate for a period of time even the main power source is absent. By way of example, the alarm system may be activated by the following conditions: detection of impact and vibration that exceed a pre-set threshold, the cartridge storages (210) are not closed, the cartridge storages (210) and items are mismatched, the items are missing from the cartridge storages (210), items are not removed from the cartridge storages (210), duress alarm activated, attempts of verification or failed authentication exceed a pre-determined threshold, back-up battery is low, and detection of power disruption or blackout.

Preferably, the shutter door system (220) may include a plurality of group controllers (401), each group controllers (401) govern operations of a plurality of individual locker controllers (402) and each individual locker controllers (402) govern operations of each cartridge storage (210). The group controllers (401) are preferably finite state machine to execute instruction received from the printed circuit boards (400) as well as receiving feedback status from the individual locker controllers (402). Each cartridge storage (210) may comprise a shutter motor control (403), which is shown in FIG. 6 as being connected to the shutter door system (220). The shutter motor control (403) moves the respective shutter door of the cartridge storage (210) between a locked position and an unlock position, a position sensor unit (404) for the detection of the positioning or status of the shutter door or the shutter motor (403), an object sensor (406) for the detection of the present of items within the cartridge storage (210), and a radio frequency identification (RFID) reader (405) for the detection of the present of RFID chip that are embedded in the stored items. The cartridge storages (210) may also incorporate a lighting bulb that are changeable in colour to represent the status of the cartridge storage. By way of example, green light may indicate the respective cartridge storage (210) is readily accessible by the user, white light may indicate the items are securely stored in the respective cartridge storage (210), and red light may indicate the respective cartridge storage (210) is empty.

Figure 7:
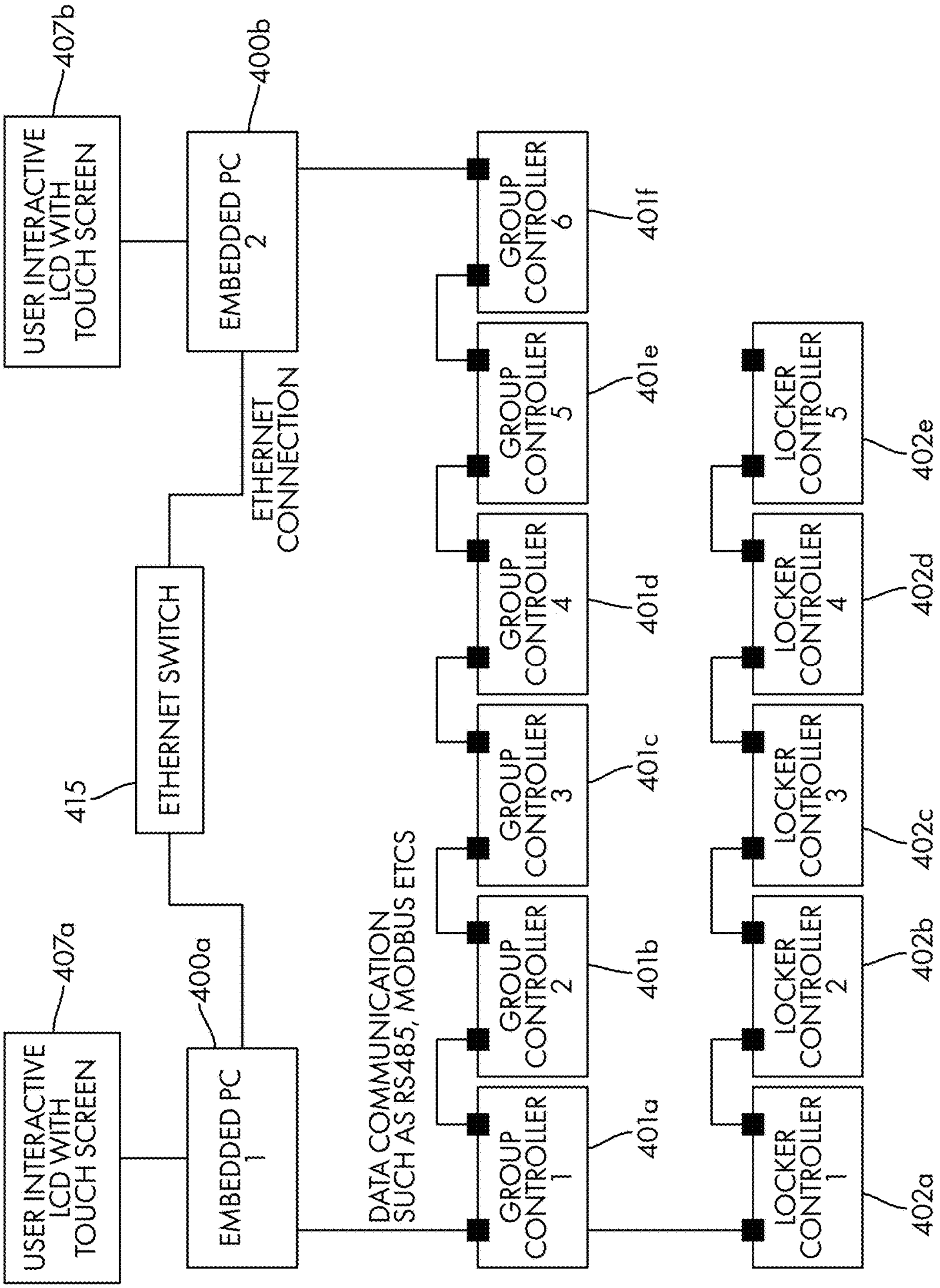
FIG. 7 is a circuit diagram illustrating a first exemplary of a redundancy arrangement.
Figure 8:
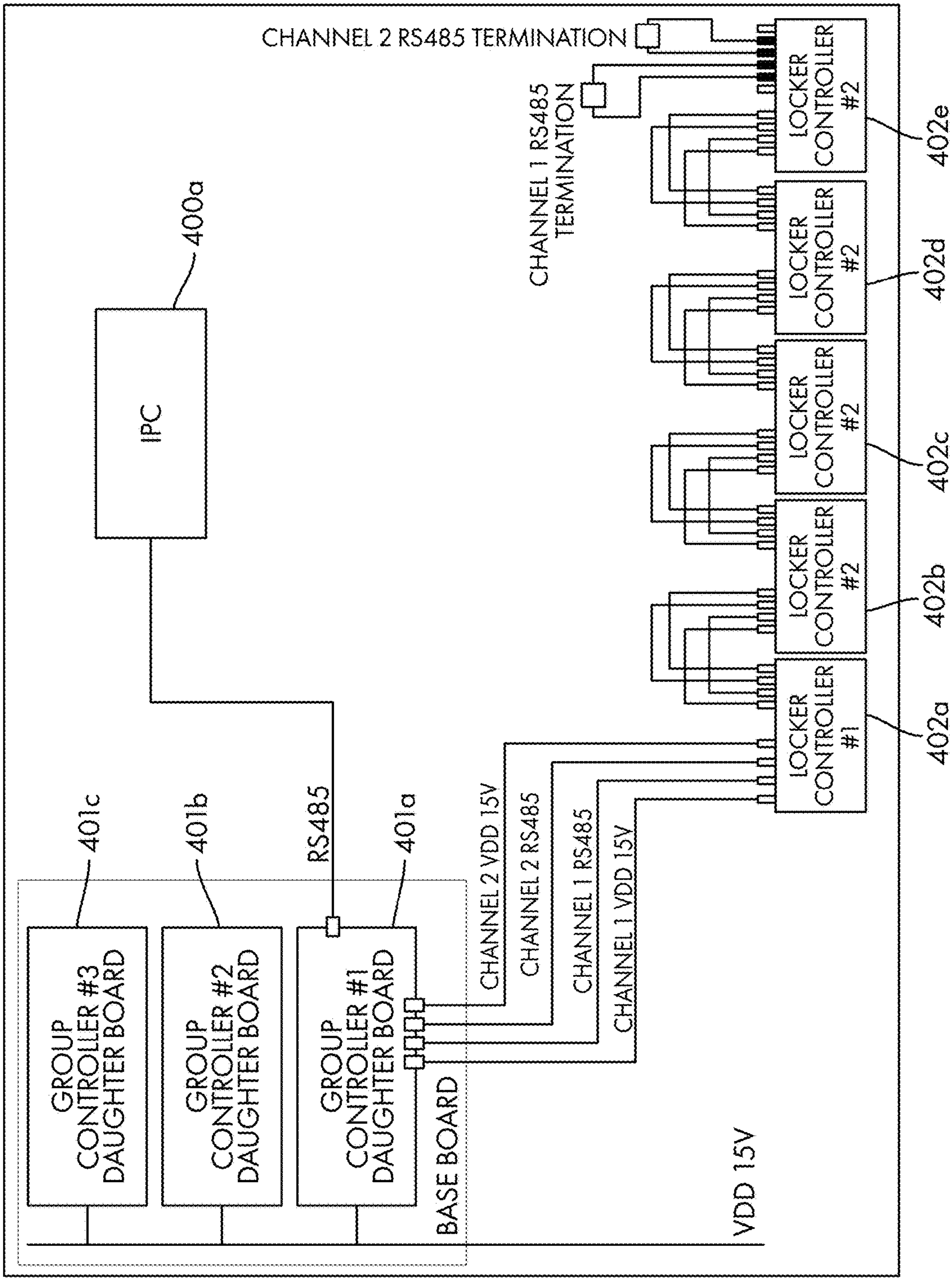
FIG. 8 is a circuit diagram illustrating a second exemplary of the redundancy arrangement.

Referring to FIG. 7, a first implementation exemplary of a redundancy arrangement to the backend circuit architecture is illustrated. By way of example, the storage cabinet (10) can be provided with two touch screen LCDs (407*a* & 407*b*) and each touch screen LCDs can be respectively connected to an industrial grade printed circuit boards (400*a* & 400*b*). Preferably, the industrial grade printed circuit boards (400*a* & 400*b*) can be embedded PCs and the embedded PCs are synchronized through ethernet switch (415) which allows users to access any lock from either one of the embedded PCs. If one embedded PC is not functioning, the other embedded PC can take over entire operations of the storage cabinet (10). As shown in FIG. 7, the storage cabinet (10) may comprise six groups of group controllers (401*a*-401*f*) which are used to control each group of five individual locker controllers (402*a*-402*e*). The embedded PCs are connected to the first group controller (401*a*) and the last group controller (401*f*) respectively, while the other group controllers (401*b*-401*e*) are connected in a daisy chain configuration to enable all of the group controllers (401*a*-401*f*) to receive instructions from the embedded PCs. The group controllers (401*a*-401*f*) work only with the embedded PC that sends the initial command, and no other command will be processed until the initial command has been completed. At the locker controller level, each locker controller (402*a*-402*e*) is connected to one another in a daisy chain pattern using two communication channels, as shown in FIG. 8, to provide additional redundancies in case of a breakdown in one of the channels. To summarise, the idea of redundancies is incorporated to ensure that the command chain functions seamlessly, with two synchronized embedded PCs operating as backup in case of one embedded PCs is malfunctioned. At the middle layer, the group controllers (401*a*-401*f*) are linked in a daisy chain pattern, with the first and last group controllers (401*a* & 401*f*) directly connected to the respective embedded PCs, making it easier to implement the redundancies feature. At the lowest level, the locker controllers (402*a*-402*e*) are also connected in a daisy chain pattern, with two communication channels in place to prevent system failure in case one of the channels experiences a breakdown.

Figure 9:
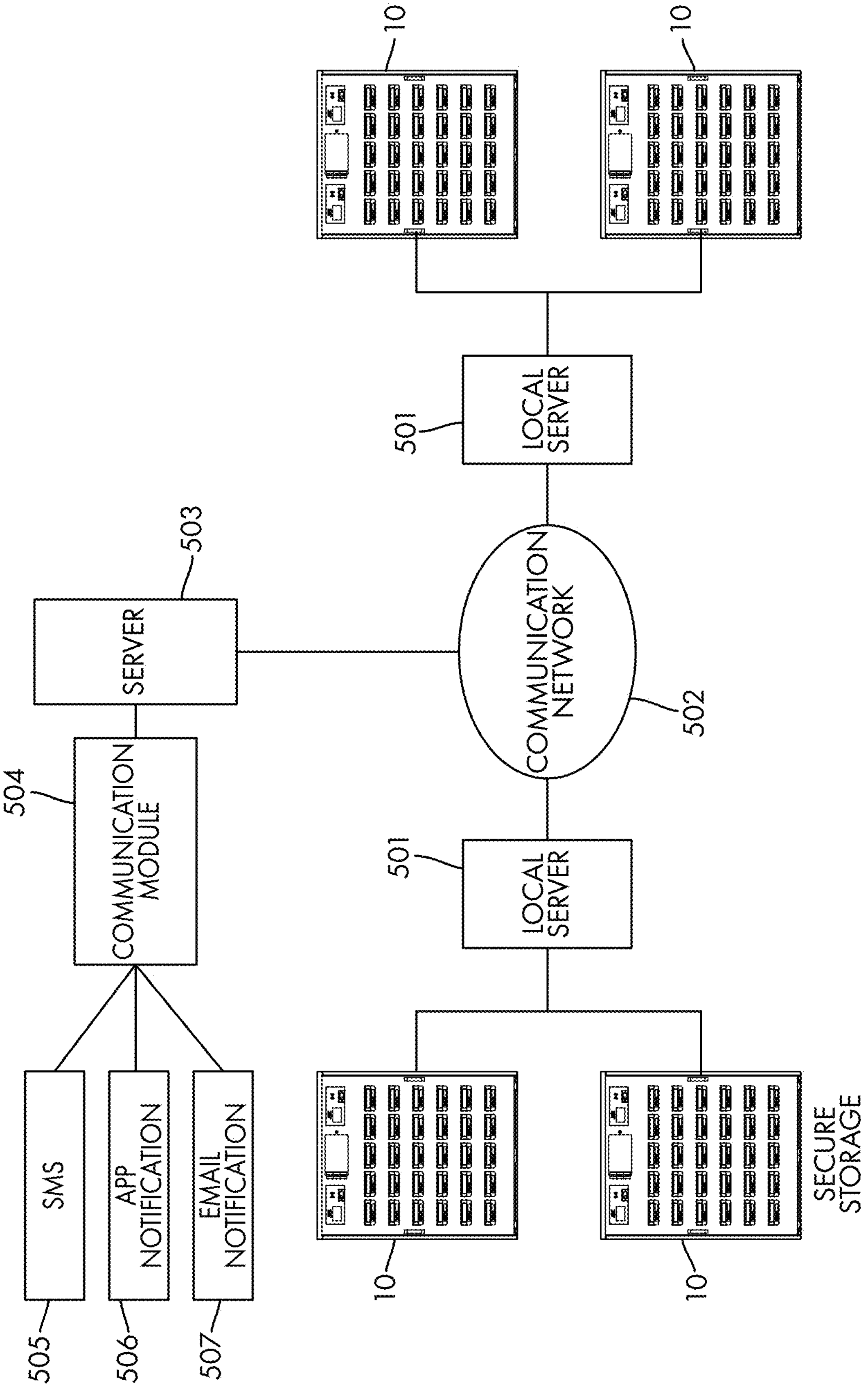
FIG. 9 is a block diagram illustrating a secured communication system.
Figure 10:
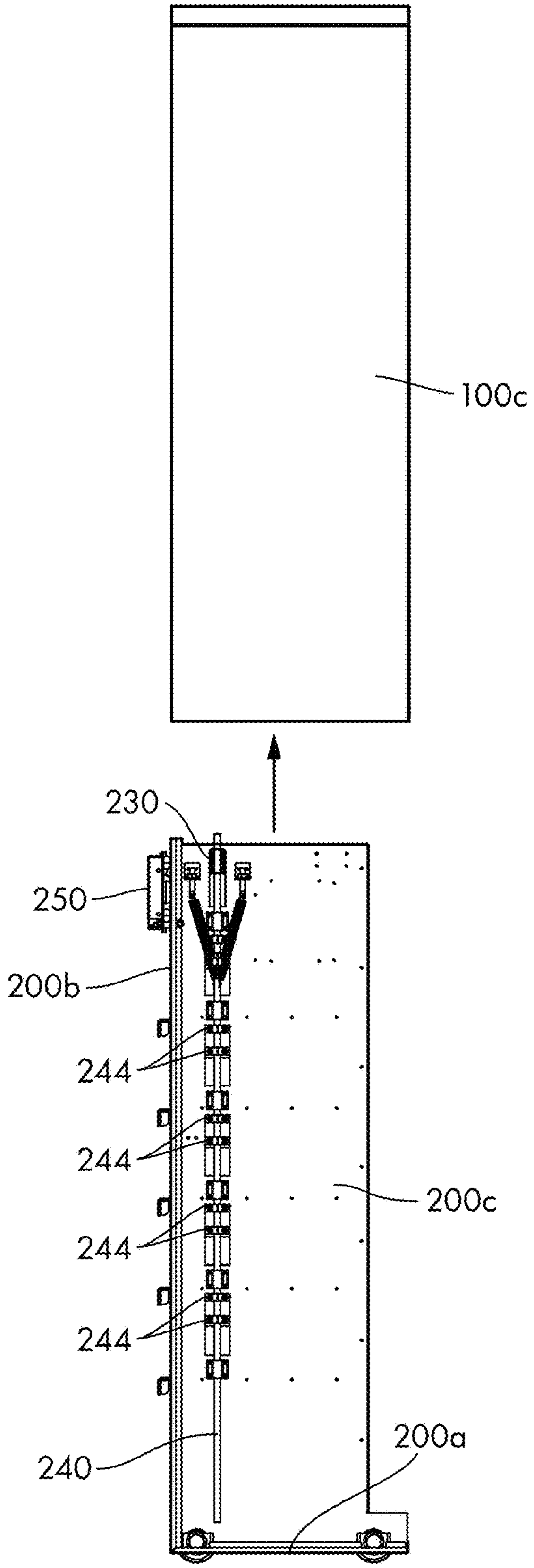

Referring to FIG. 9, a communication system for the storage unit is illustrated. Preferably, multiple storage units (10) are connected to a centralised server via a communication network and each storage unit can be connected to the communication network through a local server. The communication network can be a wired network in which the communication is established through a local network port. The communication network can also be a wireless network connection established via a wireless protocol cloud such as Long-Term Evolution (LTE) cloud, Code Division Multiple Access (CDMA) and its derivatives, Enhanced Data Rates for GSM Evolution (EDGE), 3G protocol, High Speed Packet Access (HSPA), 4G protocol, 5G protocol and the like in accordance to the advancement of wireless technology with time. The local server is commonly deployed to perform local administration, maintenance, and user management with the respective storage units (10). But it should be noted that the tasks of the local server can be easily taken over by the centralised server if needed. The centralised server is configured to collect data from all the connected storage units (10), to compile electronics records, to provide data presentation, to allow user management, to provide administrative maintenance, to alert key user on emergency via communication module. The alert can be in the form of SMS, app notification and/or email notification.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

The invention claimed is:

1. A storage unit comprising:

a cabinet body comprises:

at least one storage compartment;

a horizontal beam member arranged on one side of the cabinet body;

a vertical guide rod arranged on at least one side of the cabinet body and connected on at least one end of the horizontal beam member;

a shutter door system having at least one shutter door for each compartment coupled with a mechanism controlled by a controller unit to open or close the shutter door, where the shutter door system is connected to the horizontal beam member via the vertical guide rod;

a cam mechanism, connected to the horizontal beam member; and, an emergency lever, linked with the cam mechanism;

wherein, in use, when the emergency lever is rotated to an open position, the cam mechanism rotates in similar direction to the emergency lever, driving the horizontal beam member and the vertical guide rod up and thereby causing all the shutter doors to open simultaneously so that all the compartments can be accessed.

2. A storage unit according to claim 1, further comprising a cover having a space formed by a top panel, a rear panel, and two opposing side panels to receive the cabinet body in the space.

3. A storage unit according to claim 2, wherein bottom inner side portions of the side panels of the cover are each provided with a locking hole.

4. A storage unit according to claim 1, wherein the mechanism to which the shutter door system is coupled comprises a plurality of shutter door rods arranged horizontally and vertically to hold the shutter door for the each compartment.

5. A storage unit according to claim 2, wherein the cabinet body is locked to the cover when the emergency lever is rotated toward engage position causes the vertical guide rod to be inserted into the locking hole of the cover.

6. A storage unit according to claim 2, wherein the cabinet body is unlocked from the cover when the emergency lever is rotated toward a disengage position, which causes the vertical guide rod to be pulled out from the locking hole of the cover.

7. A storage unit according to claim 1, wherein the cam mechanism further comprises a cam and a cam follower, wherein the cam follower is arranged in the cam.

8. A storage unit according to claim 7, wherein the cam is provided with a curved slot for the cam follower to rotate freely within it.

9. A storage unit according to claim 1, wherein the cabinet body further comprises a security door provided on the cabinet body that allows the emergency lever to be accessed or prevents the emergency lever from being accessed.

10. A storage unit according to claim 9, wherein the security door is operated between unlock and lock positions using a key.

11. A storage unit according to claim 9, wherein the security door comprises an upper latch plate, a central latch plate, a lower latch plate, and a key latch plate arranged together to move relatively between lock and unlock positions of the security door using a key.

12. A storage unit according to claim 1, wherein the storage unit is adapted to store weapons, firearms or any other suitable items in the cabinet body.

* * * * *